United States Patent [19]

Whittingham

[11] Patent Number: 4,969,631
[45] Date of Patent: Nov. 13, 1990

[54] VEHICLE JACK

[75] Inventor: Reginald P. Whittingham, Tustin, Calif.

[73] Assignee: The Dometic Corporation, Santa Ana, Calif.

[21] Appl. No.: 406,583

[22] Filed: Sep. 13, 1989

[51] Int. Cl.⁵ ............................................. B60S 9/02
[52] U.S. Cl. ................................................ 254/425
[58] Field of Search ............ 254/424, 425, 423, 89 R, 254/98, 103; 192/56 R, 89 A

[56] References Cited

U.S. PATENT DOCUMENTS

| 2,069,012 | 1/1937 | Lynes | 254/425 |
| 3,182,956 | 5/1965 | Dalton | 254/419 |
| 3,402,915 | 9/1968 | Dalton | 254/419 |
| 4,067,543 | 1/1978 | Orth et al. | 254/425 |
| 4,635,904 | 1/1987 | Whittingham | 254/425 |

Primary Examiner—Robert C. Watson
Attorney, Agent, or Firm—Pearne, Gordon, McCoy & Granger

[57] ABSTRACT

An electric leveling and stabilizing jack for recreational vehicles having a vertical ground-engaging position and pivotable to a horizontal stowed position. The jack has a rigid double retraction arm which is connected on one end to a retraction sleeve and at the other end to a U-shaped housing for the motor and gear assembly. The jack has telescoping tubular members, the inner member being connected to the footpad and an expandable boot connecting the footpad to the retraction sleeve.

7 Claims, 4 Drawing Sheets

VEHICLE JACK

This invention relates to electrical vehicle jacks, especially jacks adapted for leveling and stabilizing recreational vehicles.

BACKGROUND OF THE INVENTION

A vehicle jack of the type with which the present invention is concerned is disclosed in U.S. Pat. No. 4,635,904 to Whittingham. The present invention is directed to the provision of improvements of the jack disclosed in this patent, enabling the provision of a highly reliable jack that has a greater lifting capacity and lower cost, and is more impervious to outdoor elements.

SUMMARY OF THE INVENTION

It is a feature of the present invention to provide an electrical vehicle jack mounted on each of the four corners of a recreational vehicle, and in which a rigid retraction arm is connected to a retraction sleeve, the latter being connected to a footpad and having an expandable boot for permitting movement and at the same time sealing the bottom of the jack against accumulation of water, dirt and debris within the mechanism. The retraction arm is pivoted at one end to a housing assembly and at the other end to the collar of the expandable boot.

It is a further object of the present invention to provide an electrical leveling jack which can assume a vertical position in contact with the ground, or a stowed position, when the same is pivoted to a substantially horizontal orientation relative to the ground. Thus, the housing is adapted to pivot while the actuator arm also pivots at a point slightly spaced from the pivot point of the housing to provide over-the-center action of the jack when pivoted from a vertical ground-engaging position to a horizontal stowed position.

It is a further feature of the present invention to provide an electric retractable jack having an electric motor provided with a drive shaft and gear reduction arrangement connected to an elongated internal screw, a pair of telescoping tubes, with the inner tube being provided with a ground-engaging footpad at the end thereof remote from the motor whereby rotation of the motor shaft and the gear assembly will rotate the elongated screw relative to a nut so that the inner tube and footpad are reciprocated vertically within the retraction sleeve.

Another feature of the present invention is the provision of a retraction sleeve with a flexible boot whereby when the vehicle is accidentally driven in a forward direction the boot and sleeve will move slightly upwardly, permitting the footpad to be raised up from the ground and tilted in a backward direction away from ground engagement.

BRIEF DESCRIPTION OF THE DRAWING

In order that the invention may be more clearly understood, it will now be disclosed in greater detail with reference to the accompanying drawing, wherein.

DETAILED DISCLOSURE OF THE INVENTION

Figure 4:
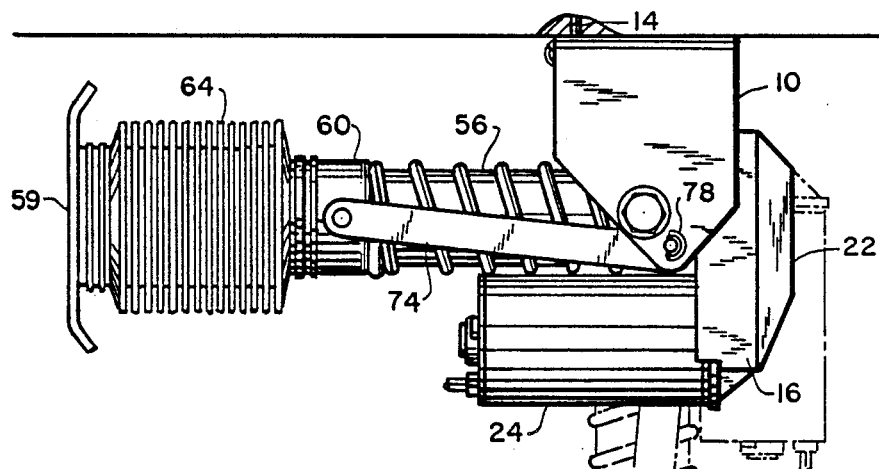
FIG. 4 is a side elevational view of the jack in both actuated vertical position, and the stowed horizontal position
Figure 5:
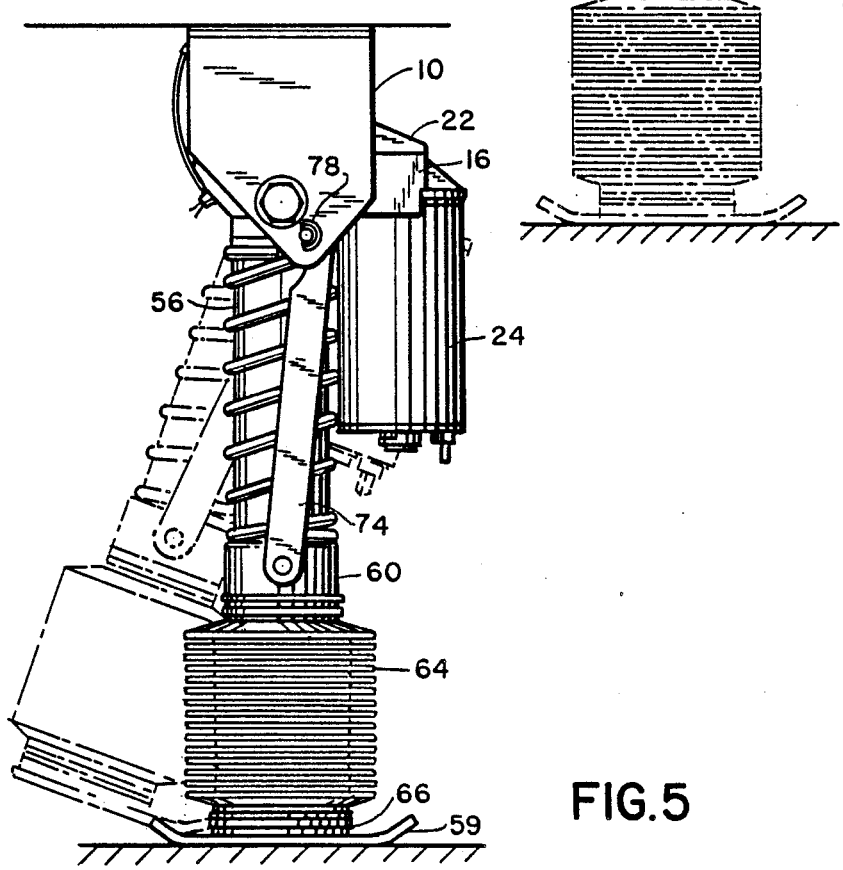
FIG. 5 is a side elevational view of the jack showing the backward pivoting thereof when the vehicle is driven forward off the vertically actuated jack.

Referring now to the drawings, an electrically operated vehicle jack constructed in accordance with the teachings of the present invention is shown including an inverted U-shaped housing or bracket 10 having a bight portion 12, which is generally planer, fixed to an underside of a vehicle, such as a recreational vehicle, by means of bolts 14, and a gear housing 16 which is pivotally mounted within the bracket 10 by means of pivot bolt 17. This bolt is threaded in a lateral manner into each of the arms of the bracket 10. The bolt 17 is journalled in flanged bushings 20 in the gear housing 16. The member 18 is a stop for the jack assembly when it moves to a horizontal position, as will be described hereinafter. The gear housing is provided with a cover 22 that is removably attached thereto in order to define a chamber for the gear mechanism. An electric motor housing 24 together with the gear housing 16 are both pivoted within the housing 10 around the pivot bolt 17 having nuts 26 at either end thereof, whereby the jack assembly can be rotated from a substantially vertical, ground-engaging position, to a substantially horizontal stowing position, as seen in FIG. 4 in both full lines and dashed lines. As further seen in FIG. 5, the electric retractable jack may be rotated to a particular angular position off the ground if the vehicle is driven off the jack, thus preventing the latter from damage or breaking.

Figure 1:
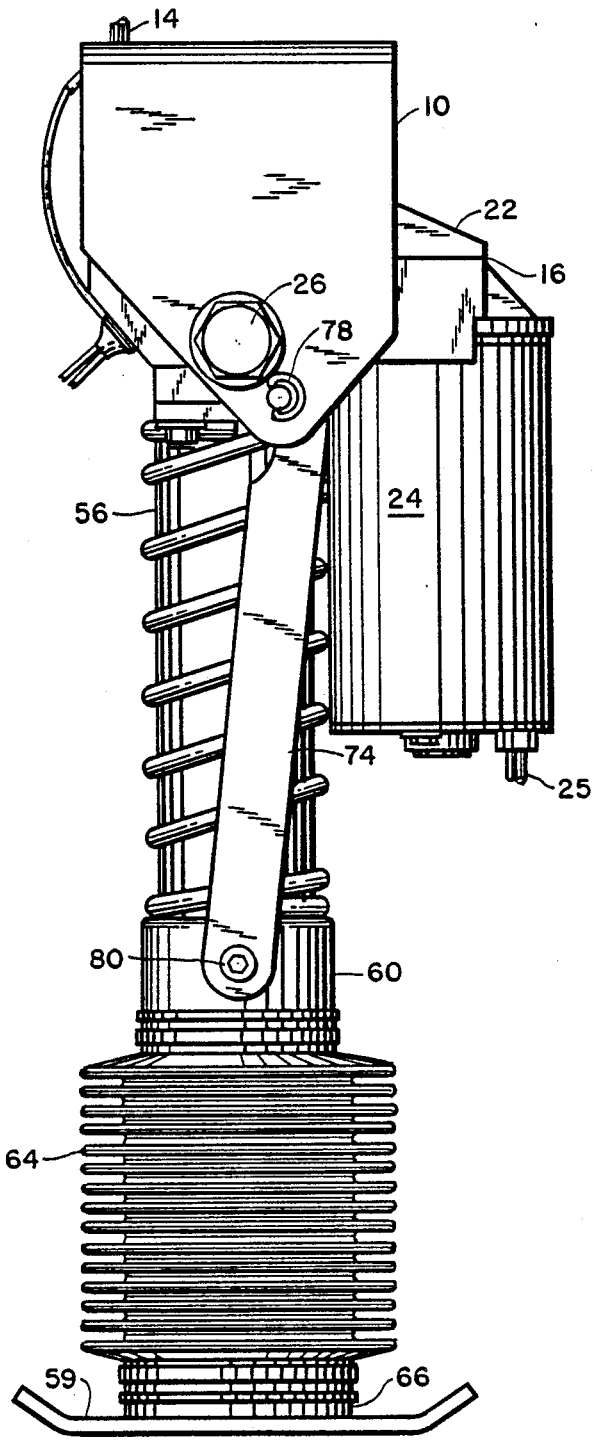
FIG. 1 is a side elevational view of an electrical vehicle jack constructed in accordance with the teachings of the present invention.
Figure 2:
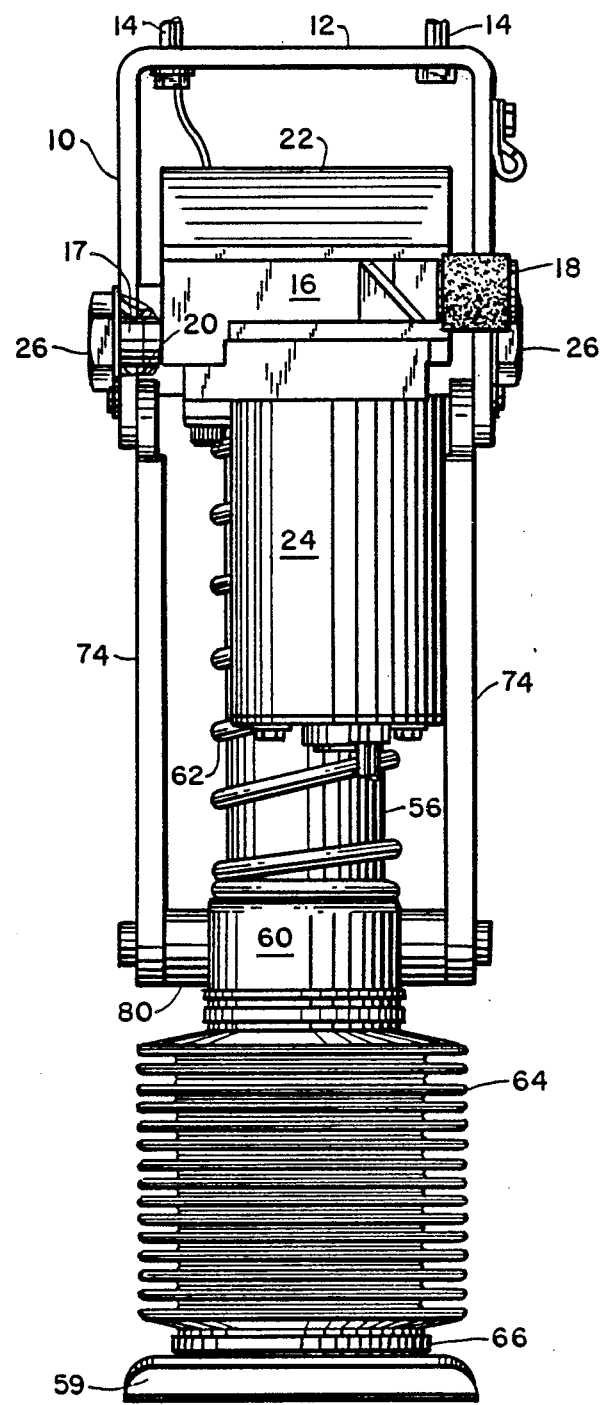
FIG. 2 is a front elevational view thereof
Figure 3:
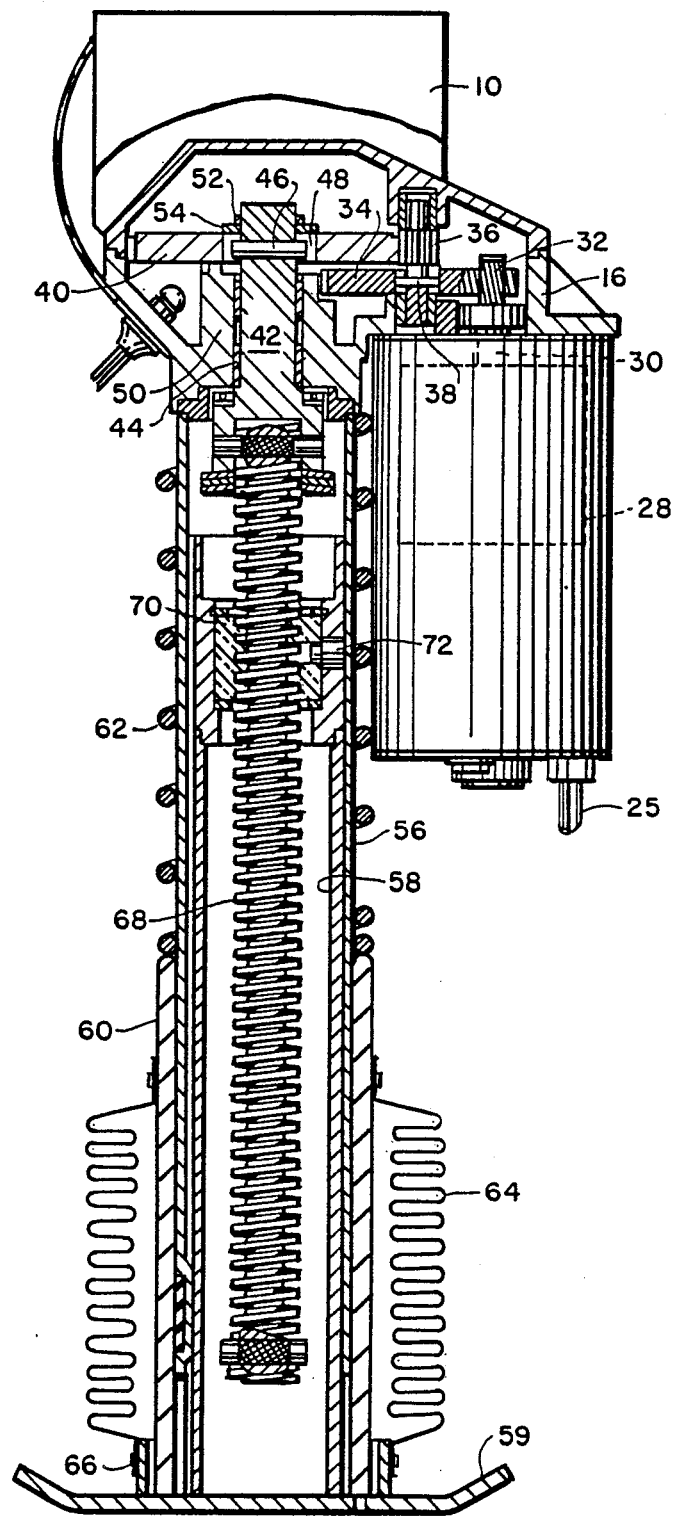
FIG. 3 is a cross-sectional view of the jack shown in FIG. 1

Referring now more particularly to the internal structure of the jack as seen in FIG. 3, the reversible motor 28 is enclosed by motor housing 24, as seen in FIGS. 1 and 2, and is connected to an electrical power source (not shown) of the type well known in the art, through wires 25. The motor shaft 30 has a gear pinion 32 which is coupled to spur gear 34. A pinion gear 36 is mounted on gear 34 by laterally disposed pin 38. Pinion gear 36 engages main gear 40. The main shaft or drive spindle 42 is journalled in bronze bushings 44 and a bore in the wall of the gear housing, and the main gear 40 is affixed to the top of shaft 42 within the gear housing. For this purpose, a pin 46 may be provided which extends laterally through the shaft and in a slot 48 of the main gear. The bottom surface of the main gear 40 engages a thrust washer 50 positioned at the top of the bore, while a retaining ring 52 on the main shaft holds a spacing washer 54 against the upper surface of the gear.

Depending from housing 10 is an elongated outer tubular member 56, and telescoped therein is a shorter inner tubular member 58. Welded, or otherwise affixed, to the bottom of inner tubular member 58 is footpad 59. Slidable over the outer tubular member, at the bottom thereof, is a retraction sleeve member 60. Also captured between the top of retraction sleeve 60 and the housing 16 is a strong compression spring 62. An accordion action boot 64 is affixed at one end to the retraction sleeve 60 and at the other end to a flange 66 of the footpad 59.

The boot 64 functions as a flexible seal for the bottom of outer and inner tubular members 56 and 58, respectively, thus preventing dirt and moisture to accumulate in the areas of the jack adjacent to the footpad. The main drive shaft or drive spindle 42 is connected to and rotates a drive screw 68. A nut 70 is screw-connected to the elongated screw 68 and is fixed to inner tube 58 by means of setscrew 72.

Referring to FIG. 1, the retraction arm assembly 74 connected at the bottom to the collar portion 61 of retraction sleeve 60 and at the top to a pivot pin 76 held in place on the housing 10 by means of an E-ring 78. As seen in FIG. 2 the retraction arm assembly is provided with a pair of bars 78 on opposite sides of the jack that are connected together by means of 80 pivots on the retraction sleeve 60.

Furthermore, as seen in FIGS. 1 and 2, the retraction arms 74 are pivotably mounted on the retraction sleeve 60. This pivotal movement produces rotation of the electric jack assembly together with the gear and motor assembly which is also pivoted to the housing 10 by means of bolt 17. Consequently, there are two adjacent pivot points, i.e., pivot pin 17 and pivot pin 76, which produces an over-the-center movement of the jack assembly to produce the above-mentioned rotation from vertical to horizontal positions as shown in FIG. 4. When it is desired to pivot or swing the jack assembly to the stowed position, the inner tubular member 58 with attached footpad 59 is raised upwardly. When this occurs, the sleeve 60 is pushed upwardly to compress the compression spring 62, thus causing the arm assembly 74 to pivot to the stowed position. The jack assembly is stopped at a substantially horizontal position when an arm of the arm assembly 74 engages the stop 18 and prevents the jack assembly from over-rotating. When it is desired to rotate the jack assembly to the vertical, ground-engaging position, the pivoting arm assembly and the compressed spring 62 drives the sleeve 60 in a downward direction against the footpad 59 to thereby lower the entire assembly. It should be apparent that when the electric jack assembly assumes the horizontal stowed position, it can also be lowered to the vertical position when the electric motor is driven in the opposite direction. The use of double retraction arms 74 and an assembly, which are connected together by a pivot bolt 80, results in a rigid pivotal arrangement which is highly reliable and has a greater lifting capacity than the vehicle leveling and stabilizing jacks of the prior art.

While the invention has been disclosed and described with reference to a single embodiment, it will be apparent that variations and modifications may be made therein, and it is therefore intended in the following claims to cover each such variation and modification as falls within the true spirit and scope of the invention.

What is claimed:

1. In an electric vehicle leveling assembly jack mounted on a vehicle frame and having an operative position in which the jack is ground-engaging and substantially vertical and an inoperative stowing position in which the jack is substantially horizontal to said vehicle frame, a mounting bracket, an outer and inner tubular telescoping members, means for pivotally connecting said outer tubular member to said bracket, the improvement comprising: a reversible electric motor having a drive shaft, a gear assembly operatively connected to said drive shaft, means mounting said electric motor and gear assembly for pivotal movement on said bracket, said inner tubular member having a footpad at the end thereof remote from said bracket, an external sleeve engageable with said footpad at one end thereof and slidable along the bottom end of said outer tubular member, a flexible boot sealingly connecting said footpad to said sleeve to prevent dirt and moisture from entering the bottonm portions of said tubular members and sleeve, a compression spring having one end engaging said sleeve, a drive spindle connected to said gear assembly, an elongated rotatable screw connected to and driven by said drive spindle, a travelling nut on said rotatable screw and attached to said inner tubular member whereby when said screw is rotated said nut and inner tubular member are movable and whereby the footpad thereon is moved to either a ground-engaging position or a ground-clearing position, and a rigid arm pivotally attached at one end to said sleeve and pivotally attached at the opposite end to said bracket whereby when said external sleeve slides up said outer tubular member, said rigid arm is capable of being pivoted on said bracket to move the jack assembly from the vertical operative position to the horizontal inoperative position, and vice versa.

2. A jack assembly as claimed in claim 1 wherein said rigid arm includes two identical arm elements.

3. A jack assembly as claimed in claim 1 wherein said boot is an expandable and contractable bellows.

4. A jack assembly as claimed in claim 1 wherein said gear assembly has a main drive gear, and said drive spindle is connected to said drive gear for rotating said spindle, said drive spindle directly driving said elongated rotatable screw.

5. In an electric vehicle leveling assembly jack mounted on a vehicle frame and having an operative position in which the jack is ground-engaging and substantially vertical and an inoperative stowing position in which the jack is substantially horizontal to said vehicle frame, a mounting bracket, an outer and inner tubular telescoping members, means for pivotally connecting said outer tubular member to said bracket, the improvement comprising: a reversible electric motor having a drive shaft, a gear assembly operatively connected to said drive shaft, means mounting said electric motor and gear assembly for pivotal movement on said bracket, said inner tubular member having a footpad at the end thereof remote from said bracket, an external sleeve engageable with said footpad at one end thereof and slidable along the bottom end of said outer tubular member, a flexible boot sealingly connecting said footpad to said sleeve to prevent dirt and moisture from entering the bottom portions of said tubular members and sleeve, a compression spring having one end engaging said sleeve, a drive spindle connected to said gear assembly, an elongated rotatable screw connected to and driven by said drive spindle, a travelling nut on said rotatable screw and attached to said inner tubular member whereby when said screw is rotated said nut and inner tubular member are movable whereby the footpad thereon is moved to either a ground-engaging position or a ground-clearing position, and a rigid arm pivotally attached at one end to said sleeve and pivotally attached at the opposite end to said bracket whereby when said external sleeve slides up said outer tubular member, said rigid arm is capable of being pivoted on said bracket to move the jack assembly from the vertical operative position to the horizontal inoperative position, and vice versa, said rigid arm including arm elements on opposite sides of said jack, and a connecting member for said arm elements including a bolt upon which said arm pivots.

6. In an electrical vehicle jacking system mounted on a vehicle for pivotal movement between a substantially horizontal stowed position and a substantially vertical operative position for ground engagement and vehicle jacking, said jacking system providing a bracket secured to said vehicle, the improvement comprising elongated inner and outer telescoping members, a first pivot pivotally mounting said outer member on said mounting bracket for pivotal movement between said stowed and operative positions, said inner telescoping member providing a footpad for ground engagement when jacking said vehicle, power means connected between said telescoping members operable to extend and retract said inner telescoping member relative to said outer telescoping member, a retraction sleeve around said outer telescoping member movable longitudinally relative thereto, resilient means operable to urge said retraction sleeve in a direction away from said first pivot, a link, a second pivot pivotally connecting said link to said sleeve, a third pivot connecting said link to said bracket at a location spaced from said first pivot, stop means operable as said inner member retracts beyond a predetermined position to cause movement of said retraction sleeve toward said first pivot against the action of said spring means and causing movement to said stowed position, extension of said inner member back to said predetermined position causing movement of said sleeve by said spring means and causing movement from said stowed position to said operative position, and a seal connected between said inner member and sleeve preventing debris from entering said telescoping members and sleeve.

7. A vehicle jack as set forth in claim 6, wherein said seal is an expandable bellows connected at one end to said inner telescoping member and at the other end to said retraction sleeve.

* * * * *